Dec. 12, 1972 M. H. DIEHL 3,705,952
VERTICAL APERTURE CORRECTION CIRCUIT
Filed Sept. 15, 1970
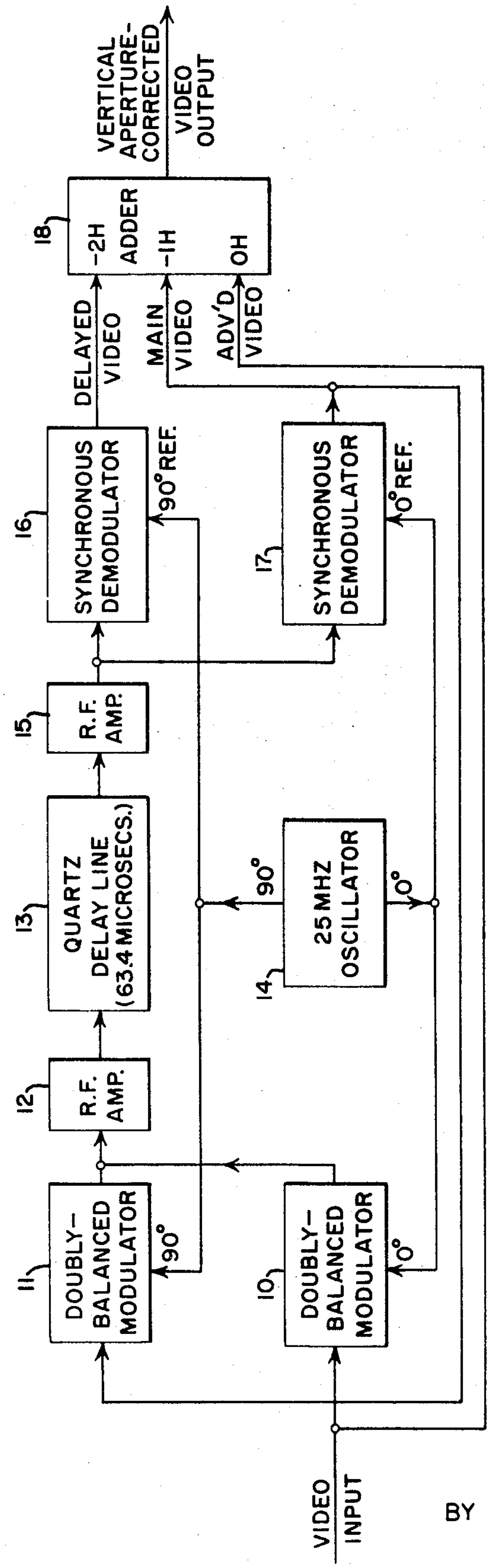
INVENTOR:
MAX H. DIEHL,
BY Marvin Snyder
HIS ATTORNEY.

United States Patent Office
3,705,952
Patented Dec. 12, 1972

3,705,952

VERTICAL APERTURE CORRECTION CIRCUIT

Max H. Diehl, Manlius, N.Y., assignor to
General Electric Company

Filed Sept. 15, 1970, Ser. No. 72,254
Int. Cl. H04n *5/14*; H03h *7/30*
U.S. Cl. 178—7.2 8 Claims

ABSTRACT OF THE DISCLOSURE

Vertical aperture correction for a television camera is achieved using but a single quartz delay line having a delay time of one horizontal line by modulating the video signal on a first carrier of given frequency and phase and supplying the modulated carrier to the delay line. The modulated carrier, thus delayed by the duration of one horizontal line, is demodulated and the modulating video signal is modulated on a second carrier of the same frequency as the first carrier but phase-displaced therefrom by 90°. The second modulated carrier, thus delayed by the duration of two horizontal lines, is demodulated and the modulating signal is combined with the undelayed video signal and the video signal delayed by one horizontal line to produce a composite, vertical aperture-corrected video signal.

INTRODUCTION

This invention relates to aperture correction for television camera pickup tubes and more particularly to vertical aperture correction using but a single quartz delay line.

In conventional television camera pickup tubes, an electron beam is scanned in raster fashion across a target electrode on which a charge pattern, defining an image corresponding to the scene being viewed by the camera, has been established, and the resulting current flow through the target electrode comprises the video output signal of the camera. However, image resolution is limited by cross sectional size of the electron beam impinging on the target electrode; that is, in most types of pickup tubes in present commercial use the electron beam, since it must be of some finite cross sectional size, tends to produce information not only from the line of the target being scanned, but also from the adjacent upper and lower lines as well, though at reduced amplitude. On the image reproducing device, a scanning electron beam responsive simultaneously to information from the line of the target desired to be scanned and to information from the adjacent upper and lower lines of the target would produce an image of poor resolution due to presence of the additional information. Circuits which correct for this degradation are known as vertical aperture correction circuits.

Most present-day television cameras using lead oxide pickup tubes require vertical aperture correction, as well as the more conventional horizontal aperture correction, in order to produce signals yielding images of satisfactory resolution for comfortable viewing. Practical vertical aperture correction circuitry requires use of quartz delay lines which are, at present, the only type of delay line known to have the requisite temperature stability together with the delay-to-rise time ratio needed to pass 4–10 mHz. video signals without distortion. Successful vertical aperture correction, however, has heretofore required use of two quartz delay lines in each correction circuit, each delay line having a delay time equal to duration of one horizontal line (63.4 microseconds) of the raster. Use of two quartz delay lines, however, entails a large expenditure due to their relatively high cost. Additionally, quartz delay lines are relatively bulky, interfering with desired miniaturization of apparatus. The present invention requires but a single quartz delay line to achieve vertical aperture correction, thereby achieving reduction in both bulk and cost of apparatus for this purpose.

Accordingly, one object of the invention is to provide a vertical aperture correction circuit employing but a single quartz delay line.

Another object of the invention is to provide a vertical aperture correction circuit employing but a single delay line for delaying the signal in the form of base band video modulated on a radio frequency carrier.

Another object is to provide a vertical aperture correction circuit wherein a high degree of peaking of the video signal may be employed without causing appreciable degradation of the reproduced image.

Briefly, in accordance with a preferred embodiment of the invention, a vertical aperture correction circuit for a television camera comprises a quartz delay line having a delay time of one horizontal line, and first modulator means furnishing the camera output signal to the input of the delay line. First and second demodulator means are provided for coupling the output of the delay line to separate inputs, respectively, of adder means. The camera output signal is received at an additional input of the adder means. Second modulator means couple the output of the first demodulator means to the input of the quartz delay line. The resultant signal produced by the adder means thus comprises information relating to the desired line, with undesired information relating to the two adjacent lines being removed by algebraic addition in the adder means.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

The single figure is a block diagram of a system embodying the instant invention.

DESCRIPTION OF TYPICAL EMBODIMENTS

In the figure, a quartz delay line 13 is shown receiving a signal from a radio frequency amplifier 12 which, in turn, receives input signals from a pair of doubly-balanced amplitude modulators 10 and 11, respectively. A typical delay line suitable for this purpose is type 63–25–QZ, available from Corning Electronics, Raleigh, N.C. Temperature stability of this model delay line is rated as $0\pm1$ part per million/° C. An oscillator 14 furnishes a 25 mHz. carrier at 0° phase shift to the carrier input of modulator 10 and a 25 mHz. carrier at 90° phase shift to the carrier input of modulator 11. The video signal from a television camera (not shown) is supplied to the signal input of modulator 10 so as to modulate the 25 mHz. 0° phase shift carrier.

Output signals from quartz delay line 13 are furnished through a radio frequency amplifier 15 to the signal inputs of each of a pair of synchronous demodulators 16 and 17, of the general type described, for example, on pages 602–607 of Grob, Basic Television, 3rd edition (McGraw-Hill, 1964). The carrier at 90° phase shift is reinserted at demodulator 16, while the carrier at 0° phase shift is reinserted at demodulator 17. Output signals from demodulator 16, designated "delayed video," are furnished to a −2H input of a 3-input adder circuit 18, while output signals from demodulator 17, designated "main video," are furnished to a −1H input thereof and also to the signal input of doubly-balanced modulator 11. The video input to doubly-balanced modulator 10, designated "advanced video," is additionally furnished to a 0H input of adder 18.

In operation, oscillator 14 continuously furnishes the 25 mHz. carrier at 0° phase shift to modulator 10 and at 90° phase shift to modulator 11. The video signal received from the camera amplitude-modulates the carrier in modulator 10 and furnishes an amplitude-modulated suppressed carrier output signal to quartz delay line 13 through amplifier 12. Suppression of the carrier is achieved in doubly-balanced modulators of the general type such as illustrated in figure 11.26 on page 416 of Chance, Waveforms, first edition (McGraw-Hill, 1949).

The amplitude-modulated signal furnished to delay line 13 from doubly-balanced modulator 10 is delayed by the delay line for a period of 63.4 microseconds, which is equal to the time required to scan one horizontal line in a standard National Television System Committee (NTSC) television raster, and is then furnished through amplifier 15 to each of demodulators 16 and 17. Demodulator 16 produces no output signal at this time, since the carrier resinserted at demodulator 16 is the 90° phase-shifted 25 mHz. signal. The reason for this is described on pages 604–605 of the aforementioned Grob text. However, an output signal is produced by synchronous demodulator 17 for reasons described by Grob, since the carrier reinserted at the demodulator is the 0° phase-shifted 25 mHz. carrier. This output signal, which represents the main video signal for any particular horizontal line of the raster, is applied to the −1H input of 3-input adder 18, and also to the signal input of doubly-balanced modulator 11. In addition, the output signal of synchronous demodulator 17 lags the video signal produced by the camera by 63.4 microseconds, so that direct application of the video signal to adder 18 constitutes the "advanced video," or video signal corresponding to the horizontal raster line scanned immediately prior to scanning the "main video" horizontal raster line.

The "main video" signal amplitude-modulates the 90° phase-shifted 25 mHz. carrier in doubly-balanced modulator 11, and the output signal of modulator 11, corresponding to a suppressed carrier amplitude-modulated with a video signal lagging the video signal produced by the camera by 63.4 microseconds, is furnished to the input of quartz delay line 13 through RF amplifier 12 and is thereby delayed by 63.4 microseconds. The output signal of quartz delay line 13 is furnished through radio frequency amplifier 15 to the signal inputs of each of demodulators 16 and 17. For reasons described on pages 604–605 of the aforementioned Grob text, this signal fails to produce an output signal from demodulator 17 inasmuch as the carrier reinserted at demodulator 17 is at 0° phase shift. However, the carrier reinserted at synchronous demodulator 16 is 90° phase-shifted and hence, for reasons described by Grob, an output signal, corresponding to the input signal furnished to doubly-balanced modulator 11, is produced at the output of demodulator 16. This signal, having been delayed by an additional 63.4 microseconds, corresponds to the video signal employed in scanning a horizontal raster line corresponding to the "main video" signal and hence is designated "delayed video." It can be seen, therefore, that the "main video" signal furnished to adder 18 at input −1H lags the "advanced video" signal furnished thereto at input 0H by the duration of one horizontal raster line, and the "delayed video" signal furnished to adder 18 at input −2H lags the "main video" signal furnished thereto by the duration of a single horizontal line also. Thus, adder 18 receives signals corresponding to three successive horizontal lines, and subtracts from the "main video" signal the "delayed video" and "advanced video" signals.

As video input signals are received from the camera, they are furnished to the 0H input of adder 18 where they are algebraically combined with video signals corresponding to each of the two preceding horizontal lines of the raster, to produce a composite video output signal.

This composite video output signal, therefore, contains information of one polarity applied to adder inputs 0H and −2H and corresponding, respectively, to the line being scanned and the second preceding line already scanned, plus information of opposite polarity applied to adder input −1H and corresponding to the line immediately preceding the line being scanned. Since the scanning electron beam of the camera has a greater cross sectional height than the thickness of a single horizontal scanning line, the video signal produced by the line contains information relevant, not only to the line being scanned, but also to the adjacent upper and lower lines. When the scanning electron beam in a television picture tube is controlled in accordance with the combined signal produced by adder 18, however, correction for vertical aperture error is accomplished by having subtracted from the information corresponding to each line, information corresponding to the adjacent upper and lower lines.

The foregoing describes a vertical aperture correction circuit employing but a single quartz delay line. The signal is delayed in the form of base band video modulated on a radio frequency carrier. By employing the vertical aperture correction circuit of the present invention, even a high degree of peaking of the video signal may be employed without causing appreciable degradation of the reproduced image.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A vertical aperture correction circuit for a television camera comprising:

a quartz delay line having a delay time substantially equal to duration of one horizontal line in the raster scanned by an electron beam in said camera;

means coupling the video output signal of said television camera to said quartz delay line comprising means for amplitude modulating said video signal on a carrier of predetermined frequency and predetermined phase;

first and second demodulating means operating in relative phase quadrature relationship coupled to the output of said quartz delay line;

modulator means coupling the output of said second demodulating means to said quartz delay line, said modulator means amplitude modulating the output signal of said second demodulating means on a carrier of said predetermined frequency but in quadrature phase relation to said predetermined phase so as to permit the video signal delayed by the duration of one horizontal line to recirculate through said quartz delay line; and algebraic adder means having first and second inputs responsive to the output signals of said first and second demodulating means, respectively, and having a third input responsive to the video output signal of said television camera, said algebraic adder means subtracting the sum of the signals received at the first and third inputs thereof from the signal received at the second input thereof to produce a vertical aperture-corrected output signal.

2. The vertical aperture correction circuit of claim 1 wherein said first demodulating means comprises a synchronous demodulator receiving said carrier at said quadrature phase relationship to said predetermined phase and said second demodulating means comprises a synchronous demodulator receiving said carrier at said predetermined phase.

3. A vertical aperture correction circuit for a television camera comprising:

a quartz delay line having a delay time substantially equal to duration of one horizontal line in the raster scanned by an electron beam in said camera;
first and second modulating means coupled to the input of said quartz delay line, said first and second modulating means each producing a modulated output signal of identical carrier frequency but in quadrature carrier phase relationship with respect to each other;
first and second demodulating means operating in relative phase quadrature relationship coupled to the output of said quartz delay line;
means coupling the video output signal of said television camera to the signal input of said first modulating means;
means coupling the output of said second demodulating means to the signal input of said second modulating means so as to permit recirculation through said quartz delay line of the video signal delayed by the duration of one horizontal line in said raster; and
signal combining means having first and second inputs responsive to the output signals of said first and second demodulating means, respectively, and having a third input responsive to the video output signal of said television camera, said signal combining means subtracting the sum of said video output signal and the output signal of said first demodulating means from the output signal of said second demodulating means to produce a vertical aperture-corrected output signal.

4. The vertical aperture correction circuit of claim 3 including a carrier frequency source of producing first and second carriers of identical frequency but in quadrature phase relationship to each other, and means coupling said carrier frequency source to each of said modulating means and each of said demodulating means so as to furnish said first carrier to said first modulating means and said second demodulating means and to furnish said second carrier to said second modulating means and said first demodulating means.

5. A vertical aperture correction circuit for the video output signal of a television camera comprising:
a quartz delay line having a delay time substantially equal to duration of one horizontal line in the raster scanned by an electron beam in said camera;
first circuit means coupling the video output signal of said television camera to the input of said quartz delay line as an amplitude modulated carrier signal of a first phase;
algebraic adder means having first, second and third inputs thereto, said first and third inputs being subtractive with respect to said second input;
first and second signal selecting means coupling the output of said quartz delay line to the first and second inputs of said adder means as an amplitude demodulated carrier signal of a first and a second phase, respectively;
second circuit means coupling the output of said second signal selecting means to the input of said quartz delay line as an amplitude modulated carrier signal of a second phase; and
means coupling the video output signal of said television camera to the third input of said adder means,
said first signal selecting means passing video signals received from said second circuit means and blocking video signals received from said first circuit means, and said second signal selecting means passing video signals received from said first circuit means and blocking video signals received from said second circuit means so as to enable said adder means to produce a vertical aperture-corrected video output signal.

6. The vertical aperture correction circuit of claim 5 wherein said first circuit means comprises modulating means producing a carrier of predetermined frequency and reference phase modulated by the video output signal of said television camera, said second signal selecting means comprises synchronous demodulating means producing the video output signal of said camera delayed by the duration of one horizontal line in said raster, said second circuit means comprises modulating means producing a carrier of said predetermined frequency but shifted in phase from said reference phase by 90 degrees and modulated by the output signal of said second signal selecting means, and said first signal selecting means comprises synchronous demodulating means producing the video output signal of said camera delayed by the duration of two horizontal lines in said raster.

7. A vertical aperture correction circuit for a video signal in a television camera comprising:
means for time delaying applied signals for a period of time substantially equal to the duration of one horizontal line in the raster scanned by an electron beam in said camera;
a source of a first and a second carrier signal;
a first modulator responsive to said first carrier signal and said video signal for providing a first modulated signal;
said means for time delaying responsive to said first modulated signal for providing a first modulated signal with a single time delay;
a first and second demodulator;
said second demodulator responsive to said first carrier signal and said first modulated signal with a single time delay for producing a demodulated video signal with a single time delay;
a second modulator responsive to said second carrier signal and said demodulated video signal with a single time delay for producing a second modulated signal;
said means for time delaying responsive to said second modulated signal for providing a second modulated signal with a double time delay;
said first demodulator responsive to said first carrier signal and said second modulated signal with a double time delay for producing a demodulated video signal with a double time delay; and
means responsive to said first-mentioned video signal, said first demodulated video signal with a single time delay and said second demodulated video signal with a double time delay for providing a vertical aperture-corrected video signal.

8. An arrangement according to claim 7 wherein said means for time delaying comprises:
a delay line;
said first and second carrier signals having the same frequency but a quadrature phase relationship;
said first and second modulators comprising doubly balanced modulators;
said first and second demodulators comprising synchronous demodulators and said last-named means comprises means for producing an output signal having a signal characteristic which is a function of said first-mentioned video signal;
said first demodulated signal with a single time delay and said second demodulated signal with a double time delay.

References Cited

UNITED STATES PATENTS

| | | | |
|---|---|---|---|
| 2,759,044 | 8/1956 | Oliver | 178—DIG. 25 |
| 3,542,947 | 11/1970 | Thurston | 178—5.4 R |

ROBERT L. RICHARDSON, Primary Examiner

J. C. MARTIN, Assistant Examiner

U.S. Cl. X.R.

178—DIG. 25; 333—30 R